(12) United States Patent
Li

(10) Patent No.: US 12,108,383 B2
(45) Date of Patent: Oct. 1, 2024

(54) METHOD AND DEVICE FOR SENDING AND RECEIVING INFORMATION AFTER TRANSFORMING FREQUENCY DOMAIN TO A TIME DOMAIN USING RESOURCE MAPPING

(71) Applicant: Beijing Xiaomi Mobile Software Co., Ltd., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 391 days.

(21) Appl. No.: 17/631,409

(22) PCT Filed: Jul. 30, 2019

(86) PCT No.: PCT/CN2019/098359
§ 371 (c)(1),
(2) Date: Jan. 28, 2022

(87) PCT Pub. No.: WO2021/016858
PCT Pub. Date: Feb. 4, 2021

(65) Prior Publication Data
US 2022/0279544 A1 Sep. 1, 2022

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0025* (2013.01); *H04L 1/0038* (2013.01); *H04W 72/0446* (2013.01); *H04W 72/0453* (2013.01)

(58) Field of Classification Search
CPC ... H04W 72/0446; H04W 4/46; H04W 92/18; H04W 72/02; H04W 4/40; H04W 72/20; H04L 5/0053; H04L 5/0094
See application file for complete search history.

(56) References Cited

U.S. PATENT DOCUMENTS

2018/0146470 A1 5/2018 Wu et al.
2019/0364585 A1* 11/2019 Lee .......................... H04W 4/40
(Continued)

FOREIGN PATENT DOCUMENTS

| CN | 105474595 A | 4/2016 |
|----|-------------|--------|
| CN | 107911153 A | 4/2018 |
| CN | 109716800 A | 5/2019 |

OTHER PUBLICATIONS

Ericsson, "L1 Format for V2V Transmissions Using Sidelink", 3GPP TSG RAN WG1 Meeting #85 R1-165277, May 27, 2016, sections 3-4, appendix B, figure 2; Type-Y.

*Primary Examiner* — Afshawn M Towfighi
(74) *Attorney, Agent, or Firm* — Volpe Koenig

(57) ABSTRACT

An information sending method is disclosed comprising: performing resource mapping in a comb arrangement manner on a frequency domain of a last time domain unit, wherein the comb arrangement manner includes at least one mapping mode; transforming the frequency domain to a time domain; and after transforming to the time domain, not sending set duration information which is at the end of the last time domain unit, wherein the set duration is determined by a target mapping modes used when the resource mapping is performed.

6 Claims, 8 Drawing Sheets

Perform resource mapping in a comb arrangement manner on a frequency domain of a last time domain unit — S101

Transform the frequency domain to a time domain — S102

Not send, after transforming to the time domain, set duration information which is at the end of the last time domain unit — S103

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2021/0036834 A1* | 2/2021 | Lee | H04L 5/0094 |
| 2022/0077983 A1* | 3/2022 | Ren | H04W 4/40 |
| 2022/0279544 A1* | 9/2022 | Li | H04L 1/0025 |
| 2024/0080073 A1* | 3/2024 | Frenne | H04B 7/0691 |

* cited by examiner

METHOD AND DEVICE FOR SENDING AND RECEIVING INFORMATION AFTER TRANSFORMING FREQUENCY DOMAIN TO A TIME DOMAIN USING RESOURCE MAPPING

CROSS-REFERENCE TO RELATED APPLICATION

The present application is a U.S. National Phase Application of International Patent Application Serial No. PCT/CN2019/098359 filed on Jul. 30, 2019. The entire contents of the above-cited application are hereby incorporated by reference in their entirety for all purposes.

BACKGROUND

Vehicle to everything (V2X) technology is a new generation of information communication technology connecting a vehicle to everything. V represents the vehicle and X represents any object interacting information with the vehicle. Currently, X can comprise a vehicle, a pedestrian, a traffic road infrastructure and a network. Modes of V2X interactions include: vehicle to vehicle (V2V) interaction mode, vehicle to infrastructure (V2I) interaction mode, vehicle to pedestrian (V2P) interaction mode, and vehicle to network (V2N) interaction mode. Cellular (short as C)-V2X is a vehicle-oriented wireless communication technology emerging with the evolution of cellular communication technologies such as $4^{th}$ generation (4G) mobile communication technology or $5^{th}$ generation (5G) mobile communication technology. C-V2X includes two types of communication interfaces, namely a short-distance direct communication interface (PC5) between the vehicle, the pedestrian, and the infrastructure, and a cellular communication interface (Uu) that can reliably communicate over long distances and greater ranges.

C-V2X technology organically links the pedestrian, the vehicle, the infrastructure, cloud elements and other traffic participating elements. It supports vehicles in obtaining more information than a single vehicle can perceive, and promotes innovation and application of autonomous driving technology. Not only that, it also facilitates building a smart transportation system and promotes development of new business models for automobile and transportation services, thus has great potential impact in improving transportation efficiency, saving resources, reducing pollution, reducing an accident rate, and improving traffic management.

Key technologies of C-V2X have some areas for improvements in core performance on the basis of long term evolution (LTE). In the PC5 interface, a physical layer structure is enhanced to support higher speeds, and support global satellite navigation system synchronization and more efficient resource allocation mechanisms and congestion control mechanisms. On the Uu interface, uplink and downlink transmission are enhanced, and a multi-access edge computing capability is taken into consideration.

Standardization of C-V2X can be divided into three stages. A R14 version standard of LTE-V2X mainly includes four aspects: business needs, system architecture, new radio technology and security research. LTE-eV2X refers to an enhanced technology research stage (R15) that supports advanced V2X service scenarios, with an objective to further improve reliability, data rate, and latency performance of a V2X pass-through mode to partially meet advanced V2X business needs. 5G-V2X refers to a technology research stage (R16+) based on 5G new radio (NR), which aims to support advanced business scenarios of V2X. 5G-V2X research was launched in June 2018, and 5G-V2X is envisioned as existing in a complementary relationship with LTE-V2X or LTE-eV2X.

SUMMARY

The present application discloses an information sending method, an information receiving method, a sending device and a receiving device, and a storage medium.

According to a first aspect of an example of the present disclosure, an information sending method is provided and is performed by a transmitter. The method includes: performing resource mapping in a comb arrangement manner on a frequency domain of a last time domain unit, the comb arrangement manner including at least one mapping mode; transforming the frequency domain to a time domain; and not sending, after transforming to the time domain, a set duration information which is at the end of the last time domain unit. The set duration is determined by a target mapping mode used when the resource mapping is performed.

According to a second aspect of an example of the present disclosure, an information receiving method is provided and is performed by a receiver. The method includes: obtaining a target mapping mode used when a resource mapping is performed on a frequency domain of a last time domain unit; determining a set duration based on the target mapping mode; and not processing set duration information which is at the end of the last time domain unit.

According to a third aspect of an example of the present disclosure, a sending device is provided, and includes: a processor; and a memory configured to store processor-executable instructions; where the processor is configured to: perform resource mapping in a comb arrangement manner on a frequency domain of a last time domain unit, the comb arrangement manner including at least one mapping mode; transform the frequency domain to a time domain; and not send, after transforming to the time domain, set duration information which is at the end of the last time domain unit. The set duration is determined based on a target mapping mode used when the resource mapping is performed.

According to a fourth aspect of an example of the present disclosure, a receiving device is provided, and includes: a processor; and a memory configured to store processor-executable instructions; wherein the processor is configured to: obtain a target mapping mode used when resource mapping is performed on a frequency domain of a last time domain unit; determine a set duration based on the target mapping mode; and not process set duration information which is at the end of the last time domain unit.

According to a fifth aspect of an example of the present disclosure, a non-transitory computer readable storage medium is provided, and it stores computer executable instructions thereon. The instructions, when executed by a processor, cause the processor to perform steps of the above information sending method.

According to a sixth aspect of an example of the present disclosure, a non-transitory computer readable storage medium is provided, and it stores a computer-executable instructions thereon. The instructions, when executed by a processor, cause the processor to perform steps of the above information receiving method.

It should be understood that both the foregoing general description and the following detailed description are exemplary and explanatory only and are not intended to limit the present disclosure.

BRIEF DESCRIPTION OF THE DRAWINGS

Drawings herein are incorporated into the specification and constitute a part of the specification, and show examples in accordance with the present disclosure, and together with the specification are used to illustrate features of the present disclosure.

DETAILED DESCRIPTION

Figure 1:
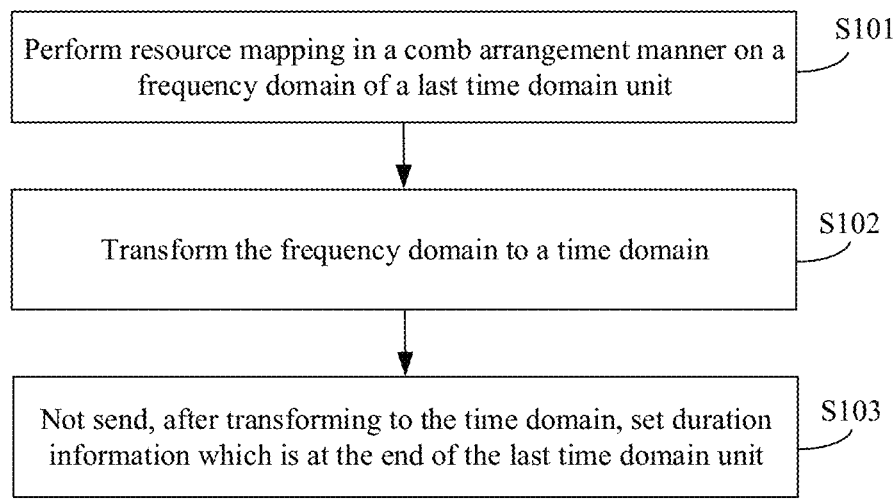
FIG. 1 is a flow chart of an information sending method illustrated by an example of the present disclosure.

Examples will be described in detail herein, instances of which are illustrated in the drawings. When the following description refers to the drawings, the same numerals in different drawings refer to same or similar elements unless otherwise indicated. The implementations described in the examples below are not intended to represent all implementations consistent with the present disclosure. On the contrary, they are merely instances of apparatus and methods consistent with some aspects of the present disclosure as recited in the appended claims.

Communication standard specification of the PC5 interface of V2X is based on device to device (D2D) communication, and adopts a broadcast communication method, that is, a single vehicle broadcasts information to multiple vehicles. In LTE V2X, a fixed subcarrier spacing is 15 KHz, and a unit of scheduling is subframe. The length of a subframe is 1 ms, and there are 14 symbols in one subframe. When data are in rate matching, raw bits are calculated according to the bearing of the 14 symbols. However, in actual mapping, to account for interference to uplink and downlink data of a base station, a guard period (GP) is introduced. In the GP the last symbol is not occupied and does not actually convey any data. Meanwhile, the first symbol is used for automatic gain control (AGC) processing. With this approach a terminal can lose use of at least two symbols of useful information, resulting in performance loss.

The first symbol and the last symbol are useful for rate matching purposes, but for purposes of transmission, the last symbol does not correspond to any data. This influences decoding performance and ultimately affects performance of a system.

In NR V2x, part or all of the first symbol needs to be used for AGC processing and estimation. In order to reduce overhead in the AGC processing, one method is to combine GP and AGC in the first symbol processing, that is, a leading end of the first symbol is unoccupied for a period of time during which no data is sent, and the last symbol conveys the data as usual.

In a current V2X system, there is no timing adjustment mechanism. If the terminal does not have a capability to adjust its timing, e.g., to advance its timing, timing of data sent by NR will be inconsistent with uplink transmission timing of NR, which will interfere with the terminal timing. That is, the last symbol of a sidelink (SL) transmission can interfere with the first symbol of a NR downlink (DL) transmission. The above-mentioned interference is prone to occurring when a terminal outside a coverage area, enters into the coverage area without synchronizing with the base station for that coverage area.

Figure 2A:
FIG. 2a is a schematic diagram of a mapping mode illustrated by an example of the present disclosure.
Figure 2B:
FIG. 2b is a schematic diagram of another mapping mode illustrated by an example of the present disclosure.
Figure 2C:
FIG. 2c is a schematic diagram of another mapping mode illustrated by an example of the present disclosure.

FIG. 1 is a flow chart of an information sending method in an example of the present disclosure. The example is described from a perspective of a transmitter. As shown in FIG. 1, the information sending method includes: in step S101, resource mapping is performed in a comb arrangement manner on a frequency domain of a last time domain unit. The comb arrangement manner includes at least one mapping mode. The transmitter may be a base station, or may be a UE. The time domain unit may include but is not limited to symbols. The comb arrangement manner may include but is not limited to three kinds of mapping modes as shown in FIG. 2a to FIG. 2c. Black blocks in FIG. 2a to FIG. 2c may represent data.

In the example, performing the resource mapping in the comb arrangement manner on the frequency domain of the last time domain unit may include but is not limited to any one of the following manners: Manner 11): a target mapping mode is selected according to a coverage area defined by a radius corresponding to a cell in which a receiver is located and a processing ability of the receiver, and a signaling carrying the target mapping mode is sent to the receiver. In the example, the base station selects the target mapping mode according to the coverage area defined by the radius corresponding to the cell in which the receiver is located and the processing ability of the receiver, and notifies the receiver through the signaling.

The target mapping modes may be represented by a preset quantity of bits, for instance, modes can be represented by two bits or one bit. When represented by two bits, for instance, 00 can be used to represent that a value corresponding to a target mapping mode shown in FIG. 2a is 2, while 01 can be used to represent that a value corresponding to a target mapping mode shown in FIG. 2b is 4, and 11 can be used to represent that a value corresponding to the target mapping mode shown in FIG. 2c is 6. When represented by one bit, for instance, 0 can be used to represent that the value corresponding to a target mapping mode shown in FIG. 2b is 4, 1 can be used to represent that a value corresponding to the target mapping mode shown in FIG. 2c is 6, and when the bit position is empty, it may signify that the value corresponding to the target mapping mode shown in FIG. 2a is a default 2.

Manner 12): the signaling carrying the target mapping modes or indication information indicating the target mapping modes sent by a cluster head in a cluster where the transmitter is located, is received. Target mapping modes are selected by the cluster head according to a transmission distance between the transmitter and a receiver and the processing ability of the receiver.

If a terminal serving as the transmitter is located in the cluster, the cluster head selects target mapping modes according to the transmission distance between the transmitter and the receiver and the processing ability of the receiver, and notifies the terminals in the cluster through the signaling or the indication information. A notifying signaling may be conveyed in a broadcast channel to notify the terminals. The indication information may be a sequence, and different mapping modes are represented by different sequences.

Manner 13): the target mapping mode is determined, and a signaling carrying the target mapping mode is sent to a receiver or indication information indicating the target mapping mode is sent to the receiver. The terminal serving as the transmitter may itself determine the target mapping mode, and send the signaling carrying the target mapping mode to the receiver or send the indication information indicating the target mapping mode to the receiver. The indication information may be a sequence, and different mapping modes are represented by different sequences.

In step S102, the frequency domain is transformed to a time domain. In step S103, after transforming to the time domain, set duration information which is at the end of the last time domain unit is not sent. The set duration is determined by the target mapping modes used when the resource mapping is performed. The set duration is determined by the target mapping modes, and the set duration is a fraction of the value corresponding to the target mapping modes. For instance, in the case that the target mapping modes is a mapping modes shown in FIG. 2a, the set duration is ½; in the case that the target mapping modes is a mapping modes shown in FIG. 2b, the set duration is ¼; and in the case that the target mapping modes is a mapping modes shown in FIG. 2c, the set duration is ⅙. In the example, after the frequency domain is transformed to the time domain, the set duration information which is at the end of the last time domain unit is not sent, so that interference caused by a last symbol of SL on a first symbol of NR DL is reduced.

In the above example, resource mapping is performed in the comb arrangement manner on the frequency domain of the last time domain unit, the frequency domain is transformed to the time domain, and after transforming to the time domain, the set duration information which is at the end of the last time domain unit is not sent, so that the interference caused by the last symbol of SL on the first symbol of NR DL is reduced.

Figure 3:
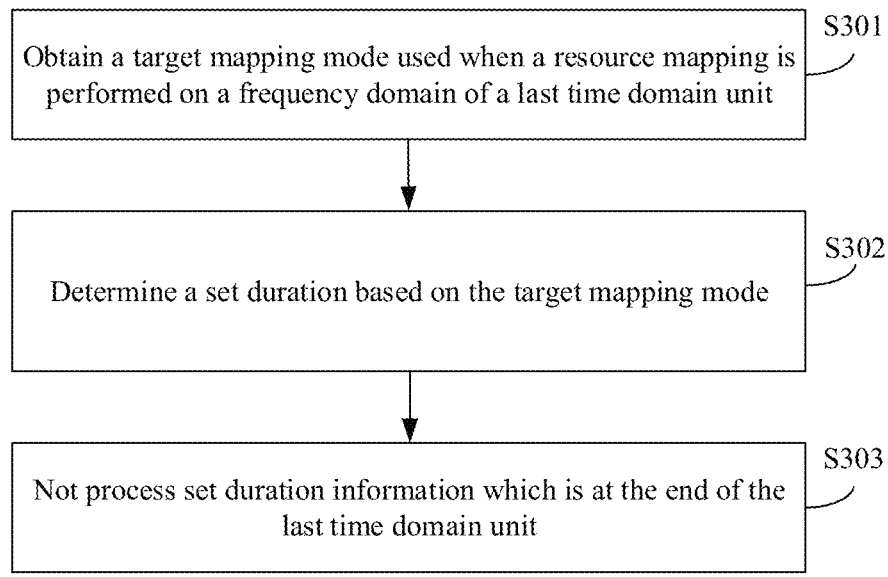
FIG. 3 is a flow chart of an information receiving method illustrated by an example of the present disclosure.

FIG. 3 is a flow chart of an information receiving method illustrated by an example of the present disclosure. The example is described from the perspective of a receiver. As shown in FIG. 3, the information receiving method includes: in step S301, a target mapping modes used when a resource mapping is performed on a frequency domain of a last time domain unit is obtained. The receiver may be a UE. The time domain unit may include but is not limited to symbols. In the example, the target mapping modes used when the resource mapping is performed on the frequency domain of the last time domain unit may be obtained through the following manners:

Manner 21): a signaling sent by a transmitter or sent by a cluster head of a cluster where the receiver is located, is received; and the target mapping mode is obtained from the signaling.

After receiving the signaling, the receiver may directly obtain the target mapping mode. For instance, if the signaling carries a target mapping modes shown in FIG. 2a, the receiver may directly obtain from the signaling that a value corresponding to the target mapping modes is 2.

Manner 22): indication information sent by the transmitter or sent by the cluster head of the cluster where the receiver is located is received, and blind detection is performed on the indication information to obtain the target mapping modes. The indication information may be but is not limited to a sequence. In the example, the target mapping modes may be obtained by performing blind detection on the indication information.

In step S302, a set duration is determined based on the target mapping mode. After the target mapping mode is obtained, the set duration may be determined to be a fraction of a value corresponding to the target mapping mode. For instance, in the case that the target mapping mode is a mapping mode shown in FIG. 2a, the set duration is ½; in the case that the target mapping mode is a mapping mode shown in FIG. 2b, the set duration is ¼; and in the case that the target mapping mode is a mapping mode shown in FIG. 2c, the set duration is ⅙.

In step S303, the set duration information which is at the end of the last time domain unit is not processed. After receiving the information, the receiver does not process the set duration information which is at the end of the last time domain unit, thus improving an information processing efficiency.

In the above example, the target mapping mode used when the resource mapping is performed on the frequency domain of the last time domain unit is obtained, the set duration is determined based on the target mapping mode, and the set duration information which is at the end of the last time domain unit is not processed, so the information processing efficiency may be improved.

Figure 4:
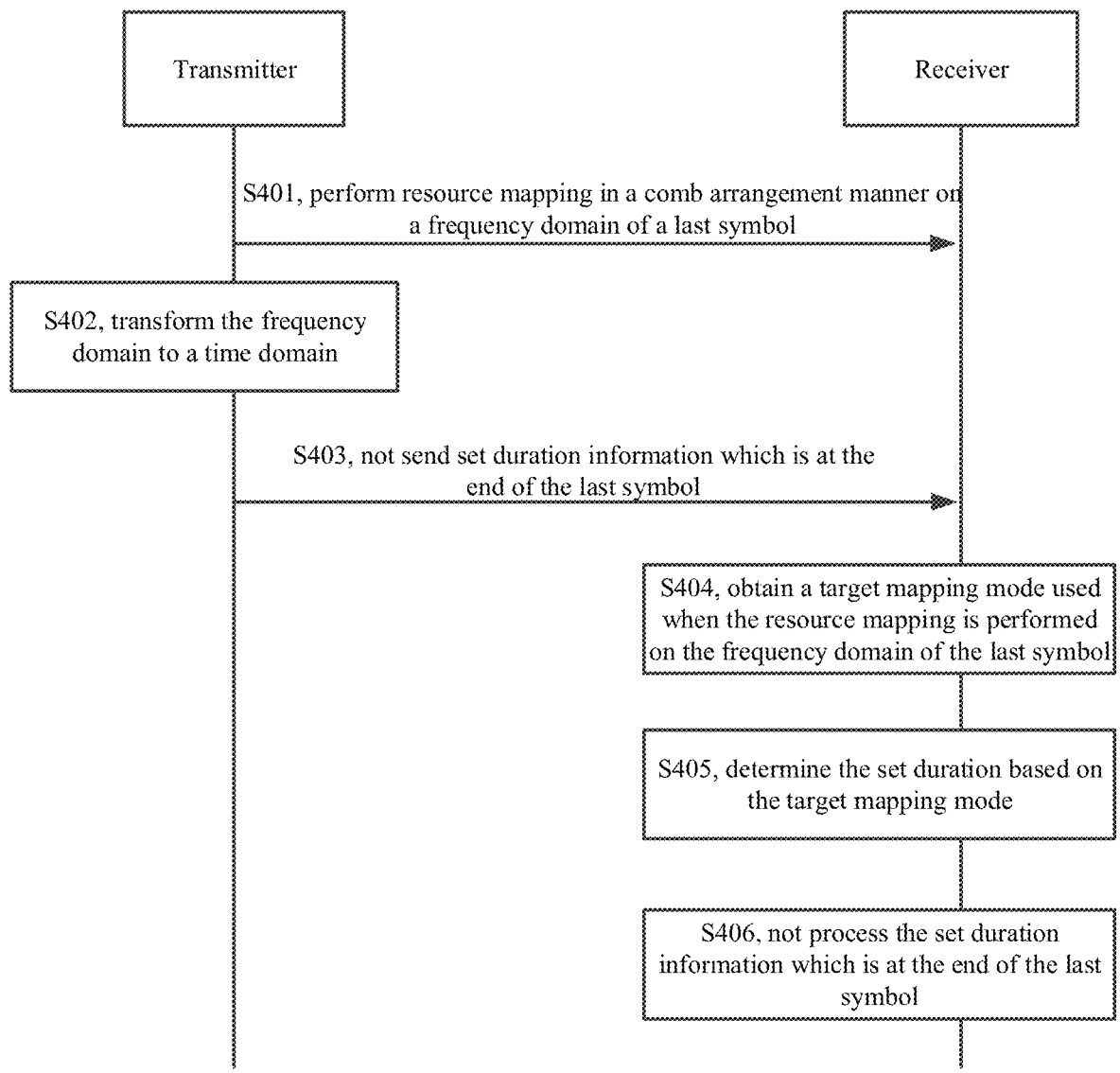
FIG. 4 is a signaling flow chart of an information receiving method illustrated by an example of the present disclosure.

FIG. 4 is a signaling flow chart of an information receiving method according to an example of the present disclosure. The example is described from a perspective of interaction between a transmitter and a receiver. As shown in FIG. 4, the information receiving method includes: in step S401, the transmitter performs resource mapping in a comb arrangement manner on a frequency domain of a last symbol. The comb arrangement manner includes at least one mapping mode. In step S402, the transmitter transforms the frequency domain to a time domain. In step S403, after transforming to the time domain, the transmitter does not send set duration information which is at the end of the last symbol. The set duration is determined by a target mapping modes used when the resource mapping is performed. In step S404, the receiver obtains the target mapping modes used when the resource mapping is performed on the frequency domain of the last symbol. There is no strict execution sequence for step S402 and step S404 above. In step S405, the receiver determines the set duration based on the target mapping modes. In step S406, the receiver does not process the set duration information which is at the end of the last symbol.

In the above example, through the interaction between the transmitter and the receiver, the transmitter does not send the set duration information which is at the end of the last symbol, so interference caused by a last symbol of SL on a first symbol of NR DL is reduced; and the set duration information which is at the end of the last symbol is not processed, so an information processing efficiency is improved.

Figure 5:
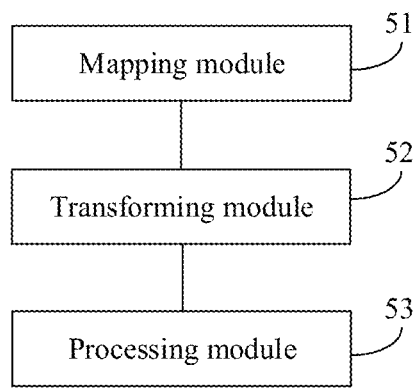
FIG. 5 is a block diagram of an information sending apparatus illustrated according to an example.

FIG. 5 is a block diagram of an information sending apparatus illustrated according to an example. The information sending apparatus is located at a transmitter. As shown in FIG. 5, the apparatus includes: a mapping module 51, configured to perform resource mapping in a comb arrangement manner on a frequency domain of a last time domain unit. The comb arrangement manner includes at least one mapping modes. The transmitter may be a base station, or may be a UE. The time domain unit may include but is not limited to symbols. The comb arrangement manner may include but is not limited to three kinds of mapping modes shown in FIG. 2a to FIG. 2c. Black blocks in FIG. 2a to FIG. 2c may represent data.

A transforming module 52, configured to transform the frequency domain mapped by the mapping module 51 to a time domain. A processing module 53, configured to not send, after transforming to the time domain by the transforming module 52, set duration information which is at the end of the last time domain unit. The set duration is determined by a target mapping modes used when the resource mapping is performed. The set duration is determined by the target mapping modes, and the set duration is a fraction of a value corresponding to the target mapping modes.

For instance, in the case that the target mapping mode is a mapping mode shown in FIG. 2a, the set duration is ½; in the case that the target mapping mode is a mapping mode shown in FIG. 2b, the set duration is ¼; and in the case that the target mapping mode is a mapping mode shown in FIG. 2c, the set duration is ⅙. In the example, after the frequency domain is transformed to the time domain, the set duration information which is at the end of the last time domain unit is not sent, so that interference caused by a last symbol of SL on a first symbol of NR DL is reduced.

In the above example, resource mapping is performed in the comb arrangement manner on the frequency domain of the last time domain unit, the frequency domain is transformed to the time domain, and after transforming to the time domain, the set duration information which is at the end of the last time domain unit is not sent, so that the interference caused by the last symbol of SL to the first symbol of NR DL is reduced.

Figure 6:
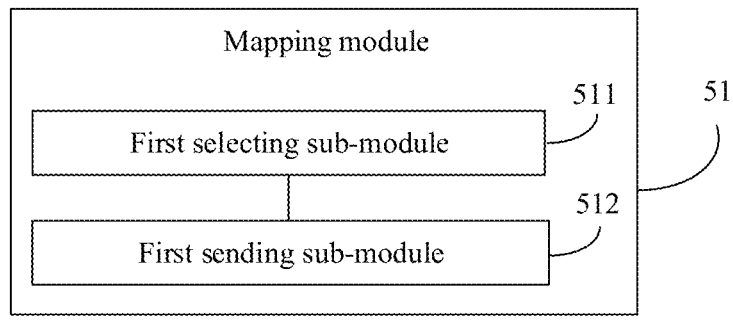
FIG. 6 is a block diagram of another information sending apparatus illustrated according to an example.

FIG. 6 is a block diagram of another information sending apparatus illustrated according to an example. As shown in FIG. 6, on the basis of the example shown in FIG. 5 above, the mapping module 51 may include: a first selecting sub-module 511, configured to select the target mapping mode according to a coverage area defined by a radius corresponding to a cell in which a receiver is located and a processing ability of the receiver; and a first sending sub-module 512, configured to send a signaling carrying the target mapping modes selected by the first selecting sub-module 511 to the receiver. In the example, the base station selects the target mapping modes according to the coverage area defined by the radius corresponding to the cell in which the receiver is located and the processing ability of the receiver, and notifies the receiver through the signaling.

The target mapping modes may be represented by a preset quantity of bits, for instance, be represented by two bits or one bit. When represented by two bits, for instance, 00 can be used to represent that a value corresponding to the target mapping mode shown in FIG. 2a is 2, 01 can be used to represent that a value corresponding to the target mapping modes shown in FIG. 2b is 4, and 11 can be used to represent that a value corresponding to the target mapping modes shown in FIG. 2c is 6. When represented by one bit, for instance, 0 can be used to represent that the value corresponding to the target mapping modes shown in FIG. 2b is 4, 1 can be used to represent that the value corresponding to the target mapping modes shown in FIG. 2c is 6, and when the bit position is empty, it may signify that the value corresponding to the target mapping mode shown in FIG. 2a is a default 2.

In the above example, the target mapping mode is selected according to the coverage area defined by the radius corresponding to the cell in which the receiver is located and the processing ability of the receiver, and the signaling carrying the target mapping mode is sent to the receiver, so that the receiver may obtain the target mapping mode used when the resource mapping is performed on the frequency domain of the last time domain unit.

Figure 7:
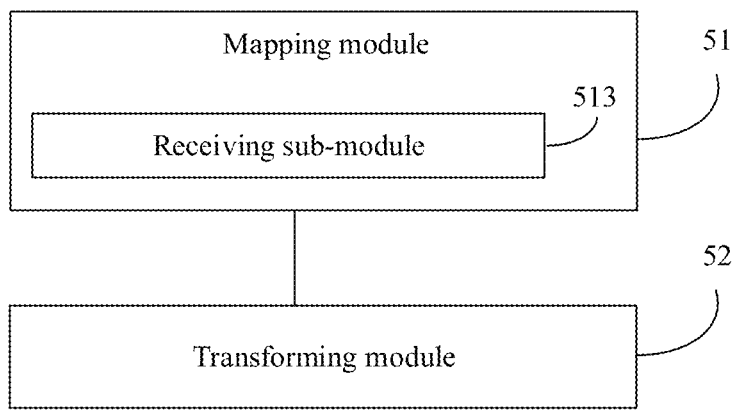
FIG. 7 is a block diagram of another information sending apparatus illustrated according to an example.

FIG. 7 is a block diagram of another information sending apparatus illustrated according to an example. As shown in FIG. 7, on the basis of the example shown in FIG. 5 above, the mapping module 51 may include: a receiving sub-module 513, configured to receive a signaling carrying the target mapping mode or indication information indicating the target mapping mode sent by a cluster head in a cluster where the transmitter is located. The target mapping mode is selected by the cluster head according to a transmission distance between the transmitter and the receiver and the processing ability of the receiver.

If a terminal serving as the transmitter is located in the cluster, the cluster head selects the target mapping mode according to the transmission distance between the transmitter and the receiver and the processing ability of the receiver, and notifies the terminals in the cluster through the signaling or the indication information. A notifying signaling may be conveyed in a broadcast channel to notify the terminals. The indication information may be a sequence, and different mapping modes are represented by different sequences.

In the above example, the signaling carrying the target mapping mode or the indication information indicting the target mapping mode sent by the cluster head in the cluster where the transmitter is located, is received. Thus, the target mapping mode used when the resource mapping is performed on the frequency domain of the last time domain unit is obtained.

Figure 8:
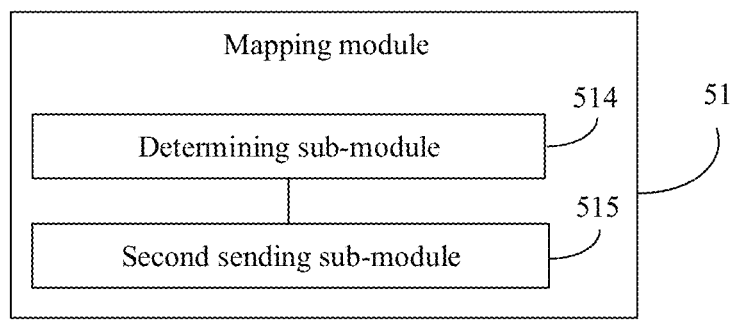
FIG. 8 is a block diagram of another information sending apparatus illustrated according to an example.

FIG. 8 is a block diagram of another information sending apparatus illustrated according to an example. As shown in FIG. 8, on the basis of the example shown in FIG. 5 above, the mapping module 51 may include: a determining sub-module 514, configured to determine the target mapping modes; and a second sending sub-module 515, configured to send the signaling carrying the target mapping mode determined by the determining sub-module 514, to the receiver; or send the indication information indicating the target mapping mode to the receiver.

The terminal serving as the transmitter may determine the target mapping mode by itself, and may send the signaling carrying the target mapping mode to the receiver; or may send the indication information indicating the target mapping mode to the receiver. The indication information may be a sequence, and different mapping modes are represented by different sequences.

In the above example, the target mapping mode is determined, the signaling carrying the target mapping mode is sent to the receiver or the indication information indicating the target mapping modes is sent to the receiver, so that the receiver may obtain the target mapping mode used when the resource mapping is performed on the frequency domain of the last time domain unit.

Figure 9:
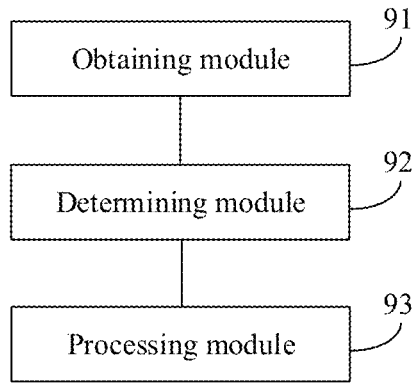
FIG. 9 is a block diagram of an information receiving apparatus illustrated according to an example.

FIG. 9 is a block diagram of an information receiving apparatus illustrated according to an example. The apparatus is located at a receiver. As shown in FIG. 9, the apparatus includes: an obtaining module 91, configured to obtain a target mapping modes used when a resource mapping is performed on a frequency domain of a last time domain unit. The receiver may be a UE. The time domain unit may include but is not limited to symbols. A determining module 92, configured to determine a set duration based on the target mapping modes obtained by the obtaining module 91.

After the target mapping modes is obtained, the set duration may be determined to be a fraction of a value corresponding to the target mapping modes. For instance, in the case that the target mapping mode is a mapping mode shown in FIG. 2a, the set duration is ½; in the case that the target mapping mode is a mapping mode shown in FIG. 2b, the set duration is ¼; and in the case that the target mapping mode is a mapping mode shown in FIG. 2c, the set duration is ⅙.

A processing module 93, configured to not process set duration information determined by the determining module 92 which is at the end of the last time domain unit. After the information is received, the set duration information which is at the end of the last time domain unit is not processed, so an information processing efficiency is improved.

In the above example, the target mapping mode used when the resource mapping is performed on the frequency domain of the last time domain unit, is obtained; the set duration is determined based on the target mapping mode, and the set duration information which is at the end of the last time domain unit is not processed; thus the information processing efficiency may be improved.

Figure 10:
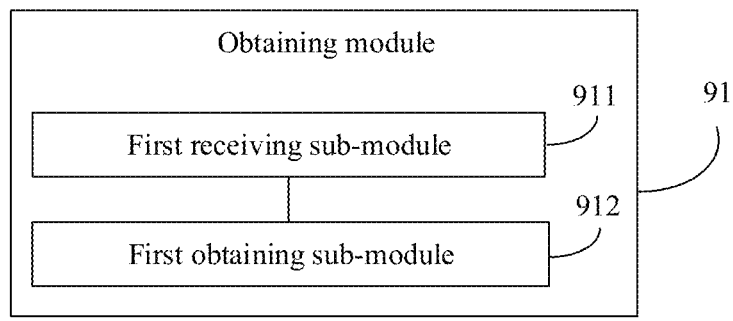
FIG. 10 is a block diagram of another information receiving apparatus illustrated according to an example.

FIG. 10 is a block diagram of another information receiving apparatus illustrated according to an example. As shown in FIG. 10, on the basis of the example shown in FIG. 9 above, the obtaining module 91 may include: a first receiving sub-module 911, configured to receive a signaling send by a transmitter or sent by a cluster head in a cluster where the receiver is located; and a first obtaining sub-module 912, configured to obtain the target mapping modes from the signaling received by the first receiving sub-module 911.

After receiving the signaling, the receiver may directly obtain the target mapping mode. For instance, if the signaling carries a target mapping mode shown in FIG. 2a, the receiver may directly obtain from the signaling that a value corresponding to the target mapping modes is 2. In the above example, the signaling sent by the transmitter or sent by a cluster head in the cluster where the receiver is located, is received; the target mapping mode is obtained from the received signaling, and a condition is provided for determining the set duration according to the target mapping modes.

Figure 11:
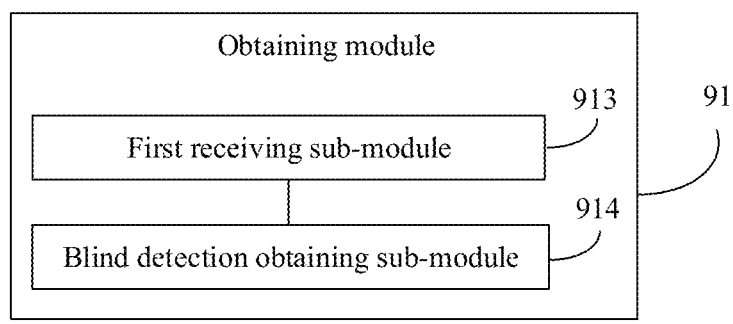
FIG. 11 is a block diagram of another information receiving apparatus illustrated according to an example.

FIG. 11 is a block diagram of another information receiving apparatus illustrated according to an example. As shown in FIG. 11, on the basis of the example shown in FIG. 9 above, the obtaining module 91 may include: a second receiving sub-module 913, configured to receive indication information sent by the transmitter or sent by a cluster head in the cluster where the receiver is located; and a blind detection obtaining sub-module 914, configured to perform blind detection on the indication information received by the second receiving sub-module 913 to obtain the target mapping mode.

In the above example, the indication information sent by the transmitter or sent by the cluster head in the cluster where the receiver is located, is received; blind detection is performed on the received indication information to obtain the target mapping mode, and a condition is provided for determining the set duration according to the target mapping mode.

Figure 12:
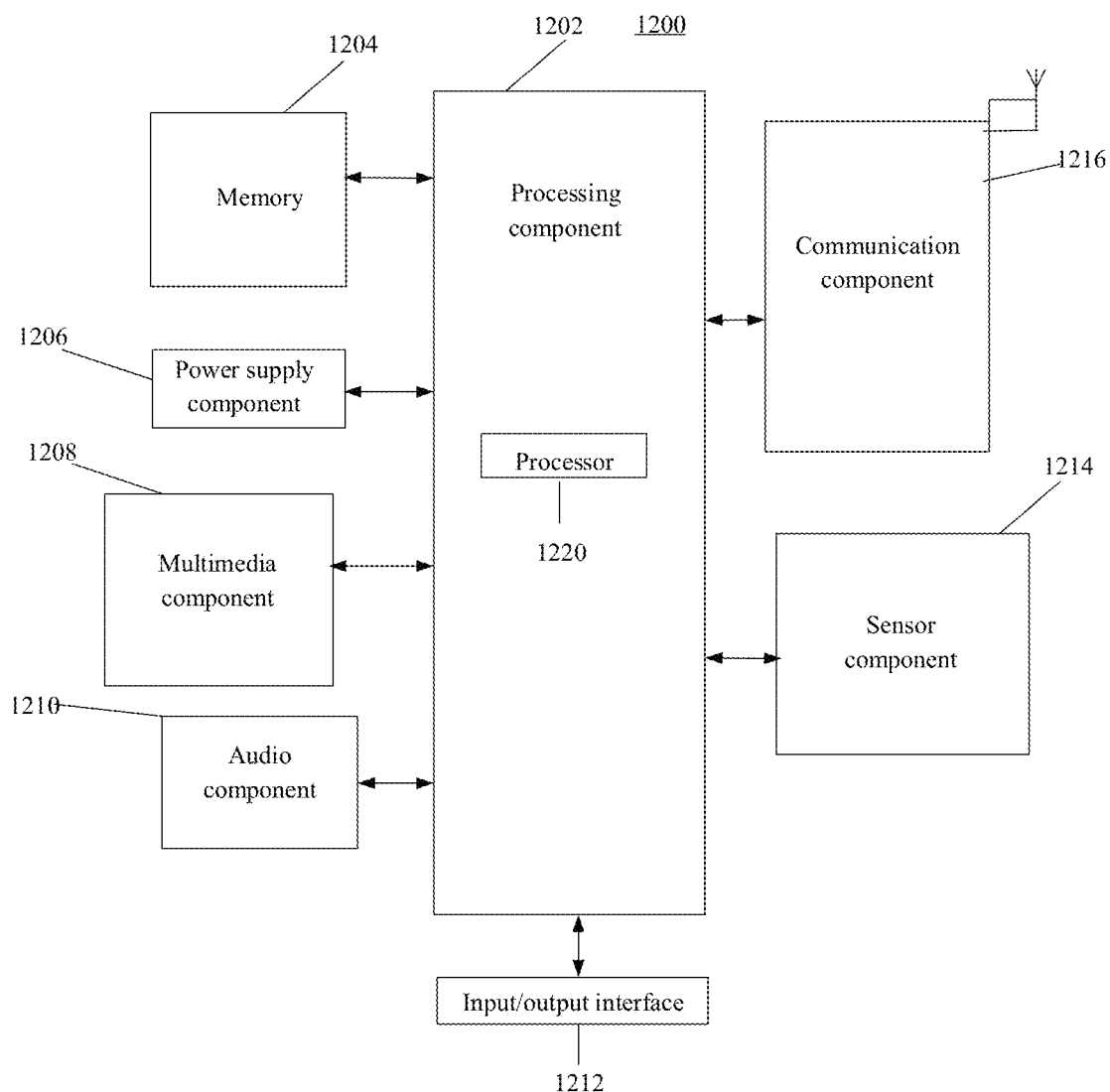
FIG. 12 is a block diagram suitable for an information sending apparatus or an information receiving apparatus illustrated according to an example.

FIG. 12 is a block diagram suitable for an information sending apparatus or an information receiving apparatus illustrated according to an example. For instance, the apparatus 1200 may be a mobile phone, a computer, a digital broadcast terminal, a messaging device, a game console, a tablet device, a medical device, a fitness device, a personal digital assistant, and other user equipment.

With reference to FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls overall operations of the apparatus 1200, such as operations associated with display, telephone calls, data communication, camera operations, and recording operations. The processing component 1202 may include one or a plurality of processors 1220 to execute instructions to complete all or part of steps of the above method. In addition, the processing component 1202 may include one or a plurality of modules to facilitate interaction between the processing component 1202 and other components. For instance, the processing component 1202 may include a multimedia module to facilitate interaction between the multimedia component 1208 and the processing component 1202.

When the apparatus 1200 serves as the information sending apparatus, one processor 1220 in the processing component 1202 may be configured to: perform resource mapping in a comb arrangement manner on a frequency domain of a last time domain unit, the comb arrangement manner including at least one mapping modes; transform the frequency domain to a time domain; and not send, after transforming to the time domain, set duration information which is at the end of the last time domain unit. The set duration is determined by a target mapping mode used when the resource mapping is performed.

When the apparatus 1200 serves as the information receiving apparatus, one processor 1220 in the processing component 1202 may be configured to: obtain a target mapping mode used when a resource mapping is performed on a frequency domain of a last time domain unit; determine a set duration based on the target mapping modes; and not process set duration information which is at the end of the last time domain unit.

The memory 1204 is configured to store various types of instructions and/or data to support operations on the apparatus 1200. Instances of these instructions and/or data include instructions for any application program or method operating on the apparatus 1200, contact data, phone book data, messages, pictures, videos, etc. The memory 1204 may be implemented by any type of volatile or non-volatile storage devices or their combination, such as a static random access memory (SRAM), an electrically erasable programmable read-only memory (EEPROM), an erasable Programmable read-only memory (EPROM), a programmable read-only memory (PROM), a read-only memory (ROM), a magnetic memory, a flash memory, a magnetic disk or an optical disk.

The power supply component 1206 provides power to various components of the apparatus 1200. The power supply component 1206 may include a power management system, one or a plurality of power supplies, and other components associated with generation, management, and distribution of the power for the apparatus 1200.

The multimedia component 1208 includes a screen that provides an output interface between the apparatus 1200 and a user. In some examples, the screen may include a liquid crystal display (LCD) and a touch panel (TP). If the screen includes the touch panel, the screen may be implemented as a touch screen to receive input signals from the user. The touch panel includes one or a plurality of touch sensors to sense touch, wipe, and gestures on the touch panel. The touch sensor may not only sense a boundary of a touch or wipe action, but also detect a duration and pressure related to a touch or wipe operation. In some examples, the multimedia component 1208 includes a front camera and/or a rear camera. When the apparatus 1200 is in an operation mode, such as a shooting mode or a video mode, the front camera and/or the rear camera may receive external multimedia data. Each front camera and rear camera may be a fixed optical lens system or have focal length and optical zoom capabilities.

The audio component 1210 is configured to output and/or input audio signals. For instance, the audio component 1210 includes a microphone (MIC). When the apparatus 1200 is in the operation mode, such as a call mode, a recording mode, and a voice recognition mode, the microphone is configured to receive external audio signals. The received audio signal may be further stored in the memory 1204 or sent via the communication component 1216. In some examples, the audio component 1210 further includes a speaker for outputting audio signals.

The I/O interface 1212 provides an interface between the processing component 1202 and a peripheral interface module. The above peripheral interface module may be a keyboard, a click wheel, buttons, and the like. These buttons may include but are not limited to: a home button, a volume button, a start button, and a lock button.

The sensor component 1214 includes one or a plurality of sensors to provide the apparatus 1200 with various aspects of status assessment. For instance, the sensor component 1214 may detect an on/off status of the apparatus 1200 and relative positioning of a component. For instance, the component is a display and a keypad of the apparatus 1200. The sensor component 1214 may also detect a position change of the apparatus 1200 or a component of the apparatus 1200, presence or absence of contact between the user and the apparatus 1200, orientation or acceleration/deceleration of the apparatus 1200, and a temperature change of the apparatus 1200. The sensor component 1214 may include a proximity sensor configured to detect presence of a nearby object when there is no physical contact. The sensor component 1214 may also include a light sensor, such as a CMOS or CCD image sensor, for use in imaging applications. In some examples, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and other devices. The apparatus 1200 may access a communication standard-based wireless network, such as WiFi, 2G or 3G, or a combination thereof. In an example, the communication component 1216 receives a broadcast signal or broadcast related information from an external broadcast management system via a broadcast channel. In an example, the communication component 1216 further includes a near field communication (NFC) module to facilitate short-range communication. For instance, the NFC module may be implemented based on radio frequency identification (RFID) technology, infrared data association (IrDA) technology, ultra-wideband (UWB) technology, Bluetooth (BT) technology and other technologies.

In an example, the apparatus 1200 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components, so as to execute the above methods.

In an example, a non-transitory computer readable storage medium including instructions is further provided, for instance, a memory 1204 including the instructions. The above instructions may be executed by a processor 1220 of an apparatus 1200 to cause the processor to carry out the above method. For instance, the non-transitory computer readable storage medium may be a ROM, a random access memory (RAM), a CD-ROM, a magnetic tape, a floppy disk, an optical data storage device, etc.

Figure 13:
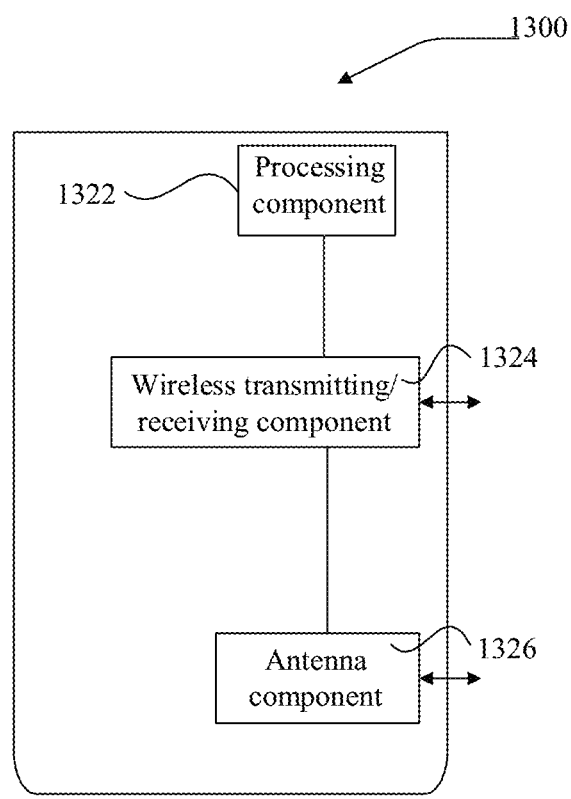
FIG. 13 is a block diagram of another information sending apparatus illustrated according to an example.

FIG. 13 is a block diagram of another information sending apparatus illustrated according to an example. The apparatus 1300 may be provided as a base station. With reference to FIG. 13, the apparatus 1300 includes a processing component 1322, a wireless transmitting/receiving component 1324, an antenna component 1326, and a signal processing part specific to a wireless interface. The processing component 1322 may further include one or more processors.

At least one processor in the processing component 1322 may be configured to: perform resource mapping in a comb arrangement manner on a frequency domain of a last time domain unit, the comb arrangement manner including at least one mapping mode; transform the frequency domain to a time domain; and not send, after transforming to the time domain, set duration information which is at the end of the last time domain unit. The set duration is determined by a target mapping mode used when the resource mapping is performed.

In an example, a non-transitory computer readable storage medium including computer-readable instructions is further provided. The above instructions may be executed by a processing component 1322 of an apparatus 1300 to carry out above information sending method. For instance, the non-transitory computer readable storage medium may be a ROM, a random access memory (RAM), a CD-ROM, a magnetic tape, a floppy disk, an optical data storage device, etc.

The apparatus examples generally correspond to the method examples. Therefore, for related apparatus parts, reference may be made to corresponding descriptions in the method examples. The apparatus examples described above are merely illustrative. The modules described as separate components may or may not be physically separated, and components displayed as modules may or may not be physical modules, that is, they may be physically located in one place, or they may be physically distributed to a plurality of network modules. Some or all of the modules may be selected according to actual needs to achieve the objectives of the solutions of the examples. Those of ordinary skill in the art, upon reading this specification can understand and implement without creative work and without undue experimentation.

Technical solutions provided by the examples of the present disclosure may have the following beneficial effects: resource mapping is performed in the comb arrangement manner on the frequency domain of the last time domain unit, the frequency domain is transformed to the time domain, and after transforming to the time domain, the set duration information which is at the end of the last time domain unit is not sent, so that the interference caused by the last symbol of SL to the first symbol of NR DL is reduced.

The target mapping mode used when the resource mapping is performed on the frequency domain of the last time domain unit, is obtained; the set duration is determined based on the target mapping mode; and the set duration information which is at the end of the last time domain unit is not processed, so an information processing efficiency may be improved.

It should be noted that relational terms herein such as first and second are only used to distinguish one entity or operation from another entity or operation, and do not necessarily require or imply any such actual relationship or sequence between these entities or operations. The terms "include", "comprise" or any other variants thereof are intended to cover non-exclusive inclusion, so that a process, method, article or device including a series of elements can include, not only those elements, but other elements that are not explicitly recited, or can also include elements inherent to such process, method, article or device. If there are no more restrictions, the element defined by the sentence "including a . . . " does not exclude the existence of other identical elements in the process, method, article or device that includes the element.

After considering the specification and appreciating the examples disclosed herein, those of skill in the art will easily think of other examples within the scope of the present disclosure. The present disclosure is intended to cover any variations, uses, or adaptive changes of the present disclosure. These variations, uses, or adaptive changes follow the general principles of the present disclosure and include common knowledge or conventional technical means in the technical field that are not necessarily expressly disclosed in the present disclosure. The specification and the examples are to be regarded as exemplary only, and the true scope and spirit of the present disclosure are pointed out by the appended claims.

It should be understood that the present disclosure is not limited to the particular structures described above and shown in the drawings. Various modifications and changes can be made without departing from the scope of this disclosure. The scope of the present disclosure is only limited by the appended claims.

What is claimed is:

1. An information sending method, performed by a transmitter, and comprising:
   performing resource mapping in a comb arrangement manner on a frequency domain of a last time domain unit, wherein the comb arrangement manner comprises at least one mapping mode;
   transforming the frequency domain to a time domain; and
   sending information before a set duration which is at the end of the last time domain unit in the last time domain unit, and not sending information in the set duration, after transforming to the time domain, wherein the set duration is determined by a target mapping mode used when the resource mapping is performed;
   wherein performing the resource mapping in the comb arrangement manner on the frequency domain of the last time domain unit further comprises any one of followings:
   selecting the target mapping mode according to a coverage area defined by a radius corresponding to a cell in which a receiver is located, and a processing ability of the receiver; and sending a signaling carrying the selected target mapping mode to the receiver;
   receiving a signaling carrying the target mapping mode or indication information indicating the target mapping mode sent by a cluster head in a cluster in which the transmitter is located, wherein the target mapping mode is selected by the cluster head according to a transmission distance between the transmitter and the receiver and a processing ability of the receiver; and
   determining the target mapping mode; and sending a signaling carrying the target mapping mode to a receiver or sending indication information indicating the target mapping mode to the receiver.

2. A non-transitory computer readable storage medium, storing a computer instruction thereon, which, when executed by a processor, performs steps of the information sending method according to claim 1.

3. An information receiving method, performed by a receiver, and comprising:
   obtaining a target mapping mode used when performing resource mapping on a frequency domain of a last time domain unit;
   determining a set duration based on the target mapping mode; and
   processing information before the set duration which is at the end of the last time domain unit in the last time domain unit, and not processing information in the set duration;
   wherein obtaining the target mapping mode used when the resource mapping is performed on the frequency domain of the last time domain unit comprises any one of followings:
   receiving a signaling sent by a transmitter or sent by a cluster head in a cluster where the receiver is located; and obtaining the target mapping mode from the signaling; and
   receiving indication information sent by a transmitter or sent by a cluster head in a cluster where the receiver is located; and performing blind detection on the indication information to obtain the target mapping mode.

4. A receiving device, comprising:
   a processor; and
   a memory configured to store processor-executable instructions;
   wherein the processor is configured to execute the steps of the information receiving method according to claim 3.

5. A non-transitory computer readable storage medium, storing a computer instruction thereon, which, when executed by a processor, performs steps of the information receiving method according to claim 3.

6. A sending device, comprising:
   a processor; and
   a memory configured to store processor-executable instructions;
   wherein the instructions configure the processor to:
   perform resource mapping in a comb arrangement manner on a frequency domain of a last time domain unit, wherein the comb arrangement manner comprises at least one mapping mode;
   transform the frequency domain to a time domain; and send information before a set duration which is at the end of the last time domain unit in the last time domain unit, and not send information in the set duration, after transforming to the time domain, wherein the set duration is determined by a target mapping mode used when the resource mapping is performed;

wherein the processor is configured to execute any one of followings:

selecting the target mapping mode according to a coverage area defined by a radius corresponding to a cell in which a receiver is located and a processing ability of a receiver; and sending a signaling carrying the target mapping mode to the receiver;

receiving a signaling carrying the target mapping mode or indication information indicating the target mapping mode, sent by a cluster head in a cluster where the transmitter is located, wherein the target mapping mode is selected by the cluster head according to a transmission distance between the transmitter and a receiver and a processing ability of the receiver; and determining the target mapping mode; and sending a signaling carrying the target mapping mode to a receiver or send indication information indicating the target mapping mode to the receiver.

* * * * *